United States Patent
Yamaguchi et al.

(10) Patent No.: US 7,060,737 B2
(45) Date of Patent: Jun. 13, 2006

(54) CURABLE COMPOSITION, CURED PRODUCT THEREOF, AND LAMINATED MATERIAL

(75) Inventors: Yoshikazu Yamaguchi, Ibaraki (JP); Takayoshi Tanabe, Ibaraki (JP); Hiroki Nakajima, Yokkaichi (JP); Hideaki Takase, Umezono (JP)

(73) Assignees: DSM IP Assets B.V., Heerlen (NL); JSR Corporation, Tokyo (JP); Japan Fine Coatings Co., Ltd., Tokyo (JP)

( * ) Notice: Subject to any disclaimer, the term of this patent is extended or adjusted under 35 U.S.C. 154(b) by 0 days.

(21) Appl. No.: 10/471,256

(22) PCT Filed: Mar. 29, 2002

(86) PCT No.: PCT/NL02/00207

§ 371 (c)(1),
(2), (4) Date: Apr. 2, 2004

(87) PCT Pub. No.: WO02/079328

PCT Pub. Date: Oct. 10, 2002

(65) Prior Publication Data

US 2004/0157972 A1 Aug. 12, 2004

(30) Foreign Application Priority Data

Mar. 30, 2001 (JP) ............................. 2001-098112
Jul. 13, 2001 (JP) ............................. 2001-213252

(51) Int. Cl.
*C08F 290/06* (2006.01)
*B29B 71/04* (2006.01)
*B35B 5/16* (2006.01)

(52) U.S. Cl. ...................... 522/77; 522/71; 522/81; 522/90; 522/96; 522/150; 522/152; 522/153; 522/173; 522/174; 522/178; 522/182; 428/323; 428/328; 428/327; 428/329; 428/331

(58) Field of Classification Search ............. 522/74–81, 522/90, 96, 150, 152, 153, 173, 174, 178, 522/182; 428/323, 328, 327, 329, 331; 427/508
See application file for complete search history.

(56) References Cited

U.S. PATENT DOCUMENTS 4,533,445 A * 8/1985 Orio ............................. 522/83
6,077,582 A * 6/2000 Yoshimura et al. ......... 428/64.1
2002/0018866 A1 * 2/2002 Matsufuji et al. ............ 428/328

FOREIGN PATENT DOCUMENTS

| EP | 843 306 | | 2/1995 |
| EP | 795 565 | | 9/1997 |
| EP | 00843306 A1 | * | 5/1998 |
| JP | 1995041705 A | | 2/1995 |
| JP | 1996060042 A | | 3/1996 |

OTHER PUBLICATIONS

English Abstract of JP 07 041705, Feb. 10, 1995, , Derwent Publications, Ltd.,.
English Abstract of JP 08 060042, Mar. 5, 2996, "Patent Abstracts of Japan, vol. 1996, No. 07,".

* cited by examiner

Primary Examiner—James J. Seidleck
Assistant Examiner—Sanza L. McClendon
(74) Attorney, Agent, or Firm—Mayer Brown Rowe & Maw LLP

(57) ABSTRACT

The invention relates to a curable resin composition, cured products thereof, and laminated materials. The curable composition comprises:
(A-1) acicular oxide particles, the oxide being an oxide of at least one element selected from the group consisting of silicon, aluminum, zirconium, titanium, zinc, germanium, indium, tin, antimony, and cerium,
(B) a compound having two or more polymerizable unsaturated groups,
(C) a photopolymerization initiator is provided.

Figure 1:
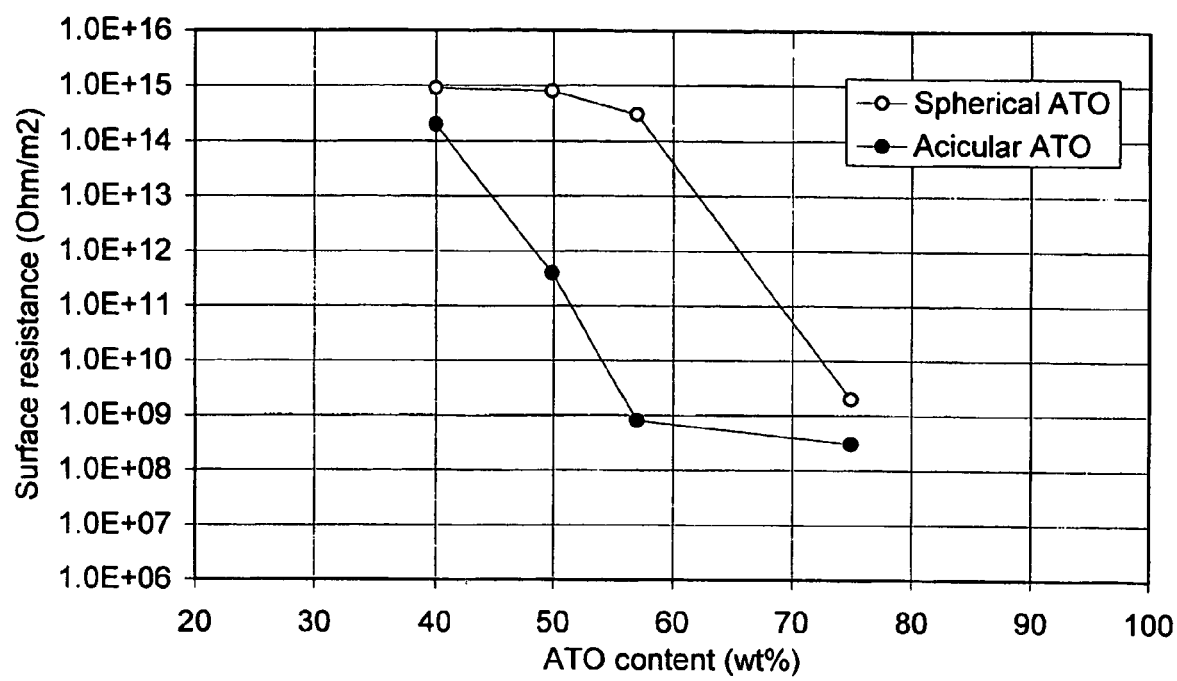

After cure, the composition has excellent scratch resistance. In addition, it may have excellent antistatic characteristics and transparency. In a preferred embodiment the composition also comprises (A-2) particles other than the acicular particles (A-1), being oxide of at least one element selected from the group consisting of silicon, aluminum, zirconium, titanium, zinc, germanium, indium, tin, antimony, and cerium.

13 Claims, 1 Drawing Sheet

CURABLE COMPOSITION, CURED PRODUCT THEREOF, AND LAMINATED MATERIAL

CROSS REFERENCE TO RELATED APPLICATIONS

This application is the National Phase of International Application PCT/NL02/00207 filed Mar. 29, 2002 which designated the U.S., was published in English, and is hereby incorporated in its entirety by reference.

The present invention relates to a curable composition suitable as a material for an antireflection film and the like, and to a cured product and laminated material made from the curable composition.

As a material for antireflection films, compositions containing a heat-curable polysiloxane, for example, are known. Such compositions are disclosed in Japanese Patent Applications Laid-open No. 247743/1986, No. 25599/1994, No. 331115/1995, and No. 232301/1998.

However, antireflection films produced from such a heat-curable polysiloxane composition exhibit poor scratch resistance, resulting in insufficient durability.

In addition, preparation of such anti reflection films requires heat treatment at a high temperature for a long time, resulting in low productivity. In addition, the type of applicable substrates must be limited.

A material for antireflection films made from a high refractive index film in which fine particles are present, localized in a high refractive index binder resin, and a low refractive index film of fluorine-containing polymer, laminated one after another, has been proposed in Japanese Patent Application Laid-Open No. 94806/1996.

More specifically, to form a high refractive index film, this method forms a layer of fine particles such as metal oxide particles on a sheet of paper, which is pressed and attached to a high refractive index binder resin on the substrate, thereby causing the fine particle layer to be embedded and the fine particles to be present locally in the high refractive index binder resin.

The low refractive index film in this laid-open patent application is prepared from a resin composition containing a fluorine-containing copolymer (copolymer of vinylidene fluoride and hexafluoropropylene), a polymerizable compound having an ethylenically unsaturated group, and a polymerization initiator.

Acicular fine particles of a metal oxide are disclosed in Japanese Patent Applications Laid-Open No. 231222/1996 and No. 12314/1997, but these Japanese Patent Applications do not disclose a material for an antireflection film using such fine particles.

Fine particles of metal oxide contained in conventional high refractive index films as disclosed in Japanese Patent Application Laid-open No. 94806/1996 are spherical in shape, with no consideration being given to the shape and the like. Such conventional high refractive index films have only insufficient scratch resistance.

The present inventors have conducted extensive studies and have discovered that a curable composition which contains acicular oxide particles, can produce a cured product and laminated material having superior scratch resistance (steel wool resistance).

Accordingly, an object of the present invention is to provide a curable composition capable of producing cured products having superior scratch resistance, and a cured product and laminated material obtained by curing such a curable composition.

Thus, the object of the present invention has been achieved by providing a curable composition comprising:
(A-1) acicular oxide particles, the oxide being an oxide of at least one element selected from the group consisting of silicon, aluminum, zirconium, titanium, zinc, germanium, indium, tin, antimony, and cerium,
(B) a compound having two or more polymerizable unsaturated groups,
(C) a polymerization initiator.

It is an advantage of the composition according to the present invention that it can provide a cured product and laminated material having improved antistatic characteristics, in comparison to compositions not comprising acicular oxide particles. Typically, good antistatic characteristics means that the cured composition has a low surface resistivity (in ohm/square).

The composition according to the invention, after having been suitably cured, preferably has a surface resistivity (measured as described in the examples section) of less than $10^{12}$ Ohm/square, more preferably, the surface resistivity is lower than the order of $10^{10}$ Ohm/square, and most preferably, of lower than $10^8$ Ohm/square. At a surface resistivity of less than $10^{12}$ Ohm/square, the antistatic characteristics are increased and attachment of dust and the like on the surface of a cured composition can effectively be prevented. Antimony-containing tin oxide (ATO) is useful in providing compositions that after cure have a low surface resisitivity. It is an advantage of using acicular ATO particles that the cured product obtained by curing the curable composition using acicular ATO can exhibit desired antistatic characteristics by the addition of a smaller amount of acicular antimony-containing tin oxide as compared with cured products obtained by curing conventional curable compositions containing spherical antimony-containing tin oxide. This is because the acicular antimony-containing tin oxide can effectively form conductive channels in the cured product even if the added amount is small. Accordingly, a reduction in the antimony-containing tin oxide to be added to the curable composition without affecting antistatic characteristics can increase transparency of the cured product.

Acicular particles (A-1) are commonly referred to as needle-shaped particles. However, it is also possible to describe the shape as fibrous, rod-like, columnar and the like. Acicular fine particles of a metal oxide are e.g. disclosed in Japanese Patent Applications Laid-Open No. 231222/1996 and No.12314/1997. In the present invention an acicular particle preferably has an aspect ratio of at least 3. The aspect ratio is defined as the ratio of the longest diameter of a particle divided by the shortest axis diameter of the particle. In European patent application EP-A-719730 it has been described how the aspect ratio was measured for acicular antimony-containing tinoxide particles. Acicular particles more preferably have an aspect ration $\geqq 5$, and most preferably $\geqq 10$.

The amount of acicular particles added to the composition according to the invention may vary between wide ranges, for example between 10–90 wt %, relative to the total weight of compounds (A-1), (B) and (C). Preferably, acicular oxide particles (A-1) are added in an amount between 15 and 70 wt %.

Examples of a compound (B), a compound having two or more polymerizable unsaturated groups (B) are vinyl compounds and (meth)acrylates. The amount of (B) can vary between wide ranges. Preferably, compound (B) is present in an amount between 5 and 40 wt %, more preferably between 5 and 30 wt %.

(Meth)acrylates are preferred as compound (B). Polyfunctional (meth)acrylate is used to increase scratch resistance and hardness of the cured product obtained by curing the curable composition. A polyfunctional (meth)acrylate is herein defined as a compound having at least two (meth) acryloyl groups in the molecule. Examples of the polyfunctional (meth)acrylate include a hydroxyl group-containing polyfunctional (meth)acrylate such as pentaerythritol tri (meth)acrylate and dipentaerythritol penta(meth)acrylate; dipentaerythritol hexa(meth)acrylate, trimethylolpropane tri (meth)acrylate, pentaerythritol tetra(meth)acrylate, trimethylolpropane trioxyethyl (meth)acrylate, tris(2-hydroxyethyl)isocyanurate tri(meth)acrylate, and the like. These polyfunctional (meth)acrylates may be used either individually or in combination of two or more.

Optionally, the curable resin composition according to the invention also comprises a compound having only one polymerizable unsaturated group.

(C) Polymerization Initiator

The amount of polymerization initiator (C) can vary between wide ranges. The amount of photoinitiators added to the curable composition of the present invention is preferably in the range of 0.5–10 wt % relative to the total composition. If the amount is less than 0.5 wt %, curing of the curable composition may be insufficient. If more than 10 wt %, on the other hand, hardness of the cured product may be decreased because the initiators function as a plasticizer. Preferably, the polymerization initiator is a photoinitiator.

Examples of the photoinitiator include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide, and the like. These photoinitiators may be used either individually or in combination of two or more.

Of the above photoinitiators, 1-hydroxycyclohexyl phenyl ketone, 2,2-dimethoxy-2-phenylacetophenone, 2-methyl-1-[4-(methylthio)phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide are particularly preferable. Inclusion of 1-hydroxycyclohexyl phenyl ketone as a photoinitiator is particularly preferable to ensure curing of the curable composition of the present invention. The amount of 1-hydroxycyclohexyl phenyl ketone is preferably in the range of 1–5 wt %.

It is preferable that the curable composition of the present invention comprise an organic solvent in addition to the components (A-1) to (C). In case the curable composition according to the invention comprises an organic solvent, the total percentage of solids, relative to the total weight of the composition, is preferably between 0.5 and 75 wt %.

The "solid content" of the reaction product refers to the content of the components excluding volatile components such as solvents. Specifically, the "solid content" refers to the content of a residue (nonvolatile components) obtained by drying the composition on a hot plate at 120° C. for one hour.

There are no specific limitations to the organic solvent. At least one solvent selected from the group consisting of ketones such as methyl ethyl ketone, methyl isobutyl ketone, cyclohexanone, and acetyl acetone; alcohols such as ethanol, iso-propanol, n-butanol, and diacetone alcohol; ether group-containing alcohols such as ethyl cellosolve, butyl cellosolve, propylene glycol monormethyl ether; hydroxy esters such as methyl lactate, ethyl lactate, and butyl lactate; β-keto esters such as ethers such as ethyl acetoacetate, methyl acetoacetoate, and butyl acetoacetoate; and aromatic hydrocarbons such as toluene and xylene can be preferably used. Of these, ketones such as methyl ethyl ketone, methyl isobutyl ketone, cyclohexanone, and acetylacetone are preferable.

In organic solvent-containing curable compositions according to the invention, acicular particles (A-1) are preferably present in an amount of between 40 and 80 wt %, relative to the total weight of solids. Compound (B) is preferably present in an amount of between 5 and 40 wt %, relative to the total weight of solids, and component (C) is preferably present in an amount of between 0.5 and 10 wt %, relative to the total weight of solids.

In a particularly preferred embodiment the curable resin composition comprises an organic solvent and has a total solid content between 0.5 and 75 wt %, and the composition comprises, between 40–80 wt % acicular antimony-containing tin oxide relative to the total amount of solids, between 5–30 wt % of a polyfunctional (meth)acrylate relative to the total amount of solids, between 0.5 and 10 wt % of a photoinitiator relative to the total amount of solids, and between 5–40 wt % of a reaction product of a hydroxyl group-containing polyfunctional (meth)acrylate and a diisocyante, hereinafter called "the acrylate-cyanate reaction product". Acicular antimony-containing tin oxide is commercially available (manufactured by Ishihara Techno Co., Ltd.). The preparation of antimony-containing acicular tinoxide has been described in EP-A-719730. The acrylate-cyanate reaction product is used to increase the scratch resistance and hardness of the cured product obtained by curing the curable composition. There are no specific restriction to the type of hydroxyl group-containing polyfunctional (meth)acrylate used in the preparation of the acrylate-cyanate reaction product. For example, a dipentaerythritol penta (meth)acrylate, pentaerythritol tri(meth)acrylate, pentaerythritol di(meth)acrylate monostearate, isocyanuric acid EO-modified di(meth)acrylate, and the like can be suitably used. Hydroxyl group-containing polyfunctional (meth) acrylates are commercially available under the trademarks KAYARAD DPHA and PET-30 (manufactured by Nippon Kayaku Co., Ltd.) and Aronix M-215, M-233, M-305, and M-400 (manufactured by Toagosei Co., Ltd.), for example.

These hydroxyl group-containing (meth)acrylates may be used either individually or in combinations of two or more.

There are no specific restriction to the type of diisocyanate used in the preparation of the acrylate-cyanate reaction product inasmuch as the diisocyanate has isocyanate groups reactive with the above hydroxyl group-containing polyfunctional (meth)acrylate. As examples of such a diisocyanate compound, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethyl phenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanatethyl)fumarate, 6-isopropyl-1,3-phenyl diisocyanate, 4-diphenylpropane diisocyanate, lysine diisocyanate, hydrogenated diphenylmethane diisocyanate, 1,3-bis(isocyanatemethyl) cyclohexane, tetramethyl xylylene diisocyanate, and 2,5 (or 6)-bis(isocyanatemethyl)-bicyclo-[2.2.1]heptane can be given. Among these, 2,4-tolylene diisocyanate, isophorone diisocyanate, xylylene diisocyanate, methylenebis (4-cyclohexylisocyanate), 1,3-bis(isocyanatemethyl)cyclohexane, and the like are desirable.

These diisocyanate may be used either individually or in combinations of two or more.

There are no specific limitations to the acrylate-isocyanate reaction product inasmuch as such a compound is a reaction product of the above hydroxyl group-containing polyfunctional (meth)acrylate and diisocyanate. A compound having two or more (meth)acryloyl groups, each having a molecular weight of 400 or less, and two or more urethane bonds (—O—C(=O)—NH—) in the molecule is preferable. A urethane (meth)acrylate represented by the following formula (1), prepared by reacting one mol of diisocyanate and two mols of a hydroxyl group-containing (meth)acrylate compound is given as a preferable example.

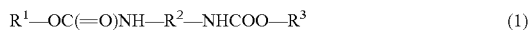

$$R^1-OC(=O)NH-R^2-NHCOO-R^3 \quad (1)$$

wherein $R^1$ and $R^3$ are individually a monovalent organic group having a (meth)acryloyl group originating from a hydroxyl group-containing polyfunctional (meth)acrylate, and $R^2$ is a divalent organic group originating from a diisocyanate.

Specific examples of the acrylate-cyanate reaction product include a reaction product of dipentaerythritol penta(meth)acrylate and 1,6-hexamethylene diisocyanate, a reaction product of dipentaerythritol penta(meth)acrylate and isophorone diisocyanate, a reaction product of dipentaerythritol penta(meth)acrylate and 2,4-tolylene diisocyanate, a reaction product of pentaerythritol tri(meth)acrylate and 1,6-hexamethylene diisocyanate, a reaction product of pentaerythritol tri(meth)acrylate and isophorone diisocyanate, a reaction product of pentaerythritol tri(meth)acrylate and 2,4-tolylene diisocyanate, and the like. These acrylate-cyanate reaction products may be used either individually or in combinations of two or more.

The methods of synthesizing these acrylate-cyanate reaction products include a method of feeding both the diisocyanate and the hydroxyl group-containing polyfunctional (meth)acrylate to a reactor and reacting the two compounds; a method of dropping the hydroxyl group-containing polyfunctional (meth)acrylate to the diisocyanate compound to react the two compounds; and a method of feeding an equivalent mol of the hydroxyl group-containing polyfunctional (meth)acrylate and diisocyanate to a reactor, and after the reaction, again feeding the additional hydroxyl group-containing polyfunctional (meth)acrylate to continue the reaction.

The amount of the acrylate-cyanate reaction product to be added to the curable composition of the present invention may be in the range of 5–40 wt %.

Both the compound (B) and the acrylate-cyanate reaction product are used to increase scratch resistance and hardness of the cured product obtained by curing the curable composition. Preferably, both compound (B) and the acrylate-cyanate reaction product are used in the present invention. The object of adding the acrylate-cyanate reaction product and the compound (B) is respectively to provide cured coatings with an appropriate elasticity and increase scratch resistance and hardness, and to provide cured coatings with elasticity and increase hardness. The amount defined above should preferably be added to make best utilization of the properties of these compounds.

The acicular oxide particles (A-1) in the composition according to the invention may be regular oxide particles, or they may be surface treated oxide particles. Surface-treated oxide particles are oxide particles of which the surface has been treated with a surface treating agent such as a coupling agent. The surface treatment usually increases dispersibility of the oxide particles. Here, a surface treatment means a treatment to modify the surface of oxide particles by mixing the particles and a surface-treating agent. Either a physical adsorption method or a method of forming chemical bonds may be used for the surface treatment, with the latter method being preferred in view of the surface treatment efficiency.

Preferably, the surface treatment results in oxide particles having organic groups on the surface, more preferably, these organic groups are polymerizable unsaturated groups.

There are no specific limitations to the polymerizable unsaturated group included in the organic compound used for obtaining surface treated oxide particles. An acryloyl group, methacryloyl group, vinyl group, propenyl group, butadienyl group, styryl group, ethynyl group, cinnamoyl group, malate group, and acrylamide group can be given as preferable examples.

In a preferred embodiment, the composition according to the invention is a composition wherein the acicular oxide particles (A-1) are surface-treated acicular oxide particles.

Surface treated oxide particles are known and described in e.g. International application WO 01/81466. Surface treated oxide particles may for example be obtained by a reaction between the oxide particles with an organic compound which comprises a polymerizable unsaturated group or with other coupling agents.

The organic compound preferably comprises the group represented by [—O—C(=O)—NH—] and at least one of the groups represented by [—O—C(=S)—NH—] and [—S—C(=O)—NH—].

The organic compound having an unsaturated polymerizable group is preferably a compound having a silanol group (hereinafter may be called "silanol group-containing compound") or a compound which forms a silanol group by hydrolysis (hereinafter may be called "silanol group-forming compound"). Examples of silanol group-forming compounds are compounds in which an alkoxy group, aryloxy group, acetoxy group, amino group, a halogen atom, or the like is bonded to a silicon atom. Preferably a compound is used in which an alkoxy group or aryloxy group is bonded to a silicon atom, that is, a compound containing an alkoxysilyl group or an aryloxysilyl group.

The silanol group or the silanol group-forming site of the silanol group-forming compound is a structural unit which bonds to the surface of oxide particles by a condensation reaction or condensation following hydrolysis.

Examples of coupling agents suitable for surface treatment include a compound having an unsaturated double bond in the molecule such as γ-methacryloxypropyltrimethoxysilane, γ-acryloxypropyltrimethoxysilane, an vinyl trimethoxysilane; a compound having an epoxy group in the molecule such as γ-glycidoxypropyltriethoxysilane and γ-glycidoxypropyltrimethoxysilane; a compound having an amino group in the molecule such as γ-aminopropyltriethoxysilane and γ-aminopropyltrimethoxysilane; a compound having a mercapto group in the molecule such as γ-mercaptopropyltriethoxysilane and γ-mercaptopropyltrimethoxysilane; an alkylsilane such as methyltrimethoxysilane, methyltriethoxysilane, and phenyltrimethoxysilane; tetrabutoxysilane, tetrabutoxyzirconium, tetraiso-propoxy-aluminum, and the like.

These coupling agents may be used either individually or in combination of two or more.

Of these coupling agents, compounds having a functional group copolymerizable or cross-linkable with an organic resin are preferable.

The amount of the surface-treated acicular oxide particles to be added to the curable composition of the present invention should preferably be in the range of 35–90 wt % in the total solid components, and the amount of the acicular oxide itself should preferably be in the range of 35–80 wt % in the total solid components.

In preparing a surface-treated acicular ATO, the amount of the surface-treating agent used is preferably in the range of 0.1–125 parts by weight, more preferably 1–100 parts by weight, and still more preferably 5–50 parts by weight, for 100 parts by weight of the acicular ATO.

If less than 0.1 part by weight, the cured product comprising the surface treated ATO may exhibit insufficient scratch resistance. If more than 125 wt %, on the other hand, the hardness of the cured product may be insufficient.

The amount of the surface-treated acicular ATO to be added to the curable composition of the present invention should preferably be in the range of 40–89.5 wt % in the total solid components, and the amount of the acicular ATO itself should preferably be in the range of 40–80 wt % in the total solid components.

In an embodiment of the invention, the curable resin composition comprises an organic solvent and has a total solid content between 0.5 and 75 wt %, and the composition comprises, between 40–89 wt % surface treated acicular antimony-containing tin oxide relative to the total amount of solids, between 5–30 wt % of a polyfunctional (meth) acrylate relative to the total amount of solids , between 0.5 and 10 wt % of a photoinitiator relative to the total amount of solids, and between 5–40 wt % of a reaction product of a hydroxyl group-containing polyfunctional (meth)acrylate and a diisocyanate.

In a particularly preferred embodiment of the composition according to the invention, the composition is a curable resin composition comprising:
(A-1) acicular oxide particles, the oxide being an oxide of at least one element selected from the group consisting of silicon, aluminum, zirconium, titanium, zinc, germanium, indium, tin, antimony, and cerium,
(A-2) oxide particles other than the acicular oxide particles (A-1), being an oxide of at least one element selected from the group consisting of silicon, aluminum, zirconium, titanium, zinc, germanium, indium, tin, antimony, and cerium,
(B) a compound having two or more polymerizable unsaturated groups,
(C) a photopolymerization initiator.

Compositions according to the invention comprising acicular oxide particles (A-1) as well as oxide particles other than acicular particles (A-2), after having been suitably cured, have a good scratch resistance, good antistatic properties and still acceptable haze values. Using only acicular oxide particles may increases the values found upon haze measurements of these compositions after cure relative to compositions not comprising acicular particles. However, by using a mixture of acicular and non-acicular oxide particles, which each independently may or may not be surface treated oxide particles, this problem has been solved.

The ratio by weight of acicular oxide particles (A-1) and particles other than the acicular particles (A-2) which is defined as the weight of particles (A-1) divided by the total weight of particles (A-1) and (A-2) may vary between wide ranges, for example between 0.095 and 0.95.

Preferably, the curable composition according to the invention comprises particles (A-1) and (A-2) in a ratio by weight of between 0.2 and 0.9, more preferably between 0.3 and 0.6.

Preferred acicular particles (A-1) to be used in the curable resin composition according to the invention are surface-treated acicular antimony-containing tin oxide particles. Preferred as particles (A-2) other than acicular particles to be used in a curable composition according to the invention are surface-treated zirconium oxide particles or antimony-containing tin oxide particles.

Other Ingredients

In the present invention, various additives may be added to the composition in addition to the above components provided that they do not impair the desired properties of the coating. As examples of additives, antioxidants, antistatic agents, photosensitizers, light stabilizers, UV absorbers (hereinafter may be called "UV absorbers (G)"), silane coupling agents, aging preventives, heat-polymerization inhibitors, coloring agents, leveling agents, surfactants, preservatives, plasticizers, lubricants, inorganic fillers, organic fillers, wettability improvers, coating surface improvers, and the like can be given.

The curable composition of the present invention can be prepared by mixing the component (A-1) or a combination of component (A-1) and (A-2) to component (B) and (C), and optionally the organic solvent, and other optional components or additives at room temperature or with heating. Specifically, the composition can be prepared by using a mixing instrument,such as a mixer, kneader, ball mill, or three roll mill. When the components are mixed under heating conditions, the heating temperature is preferably less than the decomposition temperature of the polymerization initiator. When a thin film with a thickness of 1 µm or less, the curable composition may be diluted with an organic solvent before coating.

There are no specific limitations to the method of laminating the composition of the present invention on a substrate. For example, a method of applying the composition to a substrate can be given.

As examples of a substrate to which the composition is applied, plastics (polycarbonate, polymethacrylate, polystyrene, polyester, polyolefin, epoxy resins, melamine resins, triacetylcellulose resins, ABS resins, AS resins, norbornene resins, etc.), metals, wood, paper, glass, slates, and the like can be given. The substrate may be a plate, film, or three-dimensional molded body. As a method of applying the composition, dip coating, spray coating, flow coating, shower coating, roll coating, spin coating, screen printing, ink jet printing, brush coating, or the like can be employed. The thickness of the film after curing and drying is preferably 0.05–400 µm, and still more preferably 1–200 µm.

The composition of the present invention may be diluted with a solvent to adjust the formulation viscosity and thereby the film thickness. The viscosity of the composition used as a hard coat for a plastic lens, for example, is usually 0.1–10,000 mPa·s/25° C., and preferably 0.5–2,000 mPa·s/ 25° C.

The composition of the present invention is cured using radiation (light) or the like. Preferably, the composition according to the invention is a photocurable composition.

There are no specific limitations to the source of radiation insofar as the composition is cured in a short period of time after being applied. As examples of the source of infrared rays, a lamp, resistance heating plate, laser, and the like can be given. As examples of the source of visible rays, sunlight, a lamp, fluorescent lamp, laser, and the like can be given. As the source of ultraviolet rays, a mercury lamp, halide lamp, laser, and the like can be given. As examples of the source of electron beams, a system of utilizing thermoelectrons produced by a commercially available tungsten filament, a cold cathode method generating electron beams by passing a high voltage pulse through a metal, and a secondary electron method which utilizes secondary electrons produced by the collision of ionized gaseous molecules and a metal electrode can be given. As the source of α-rays, β-rays, and γ-rays, fissionable substances such as $Co^{60}$ and the like can be given. For γ-rays, a vacuum tube which causes an acceleration electron to collide with an anode and the like can be used. The radiation can be used either individually or in combination of two or more. In the latter case, two or more types of radiation may be used either simultaneously or with certain intervals of time.

As a specific example of forming a cured film, a method of applying the composition to a substrate, removing volatile components by drying at a temperature of preferably 0–200° C., and curing the composition using heat and/or radiation can be given. Curing using heat is preferably carried out at 20–150° C. for 10 seconds to 24 hours. When using radiation, use of ultraviolet rays or electron beams is preferable. The dose of ultraviolet rays is preferably 0.01–10 $J/cm^2$, and still more preferably 0.1–5 $J/cm^2$. Electron beams are preferably irradiated with an accelerated voltage of 10–300 KV and an electron density of 0.02–0.30 $mA/cm^2$ at a dose of 1–10 Mrad.

The invention also relates to a cured product produced by curing the composition according to the invention. Since the curable composition of the present invention has suitable in antistatic characteristics, scratch resistance, and transparency, the composition can be used as an antireflection film, stain-proof membrane, water repellency membrane, electronic parts, optical parts, package containers, and antireflection membrane.

The invention also relates to composite products prepared by laminating the cured film on the substrate. Laminated products are products comprising a layer of the cured composition according to the invention on a substrate. In a preferred embodiment of the laminated material, the laminated material comprises a layer of the cured composition according to the invention with a thickness of the cured composition layer of between 0.05–20 μm.

The present invention will now be described in detail by way of examples, which should not be construed as limiting the present invention. In the examples, "part(s)" refers to "part(s) by weight" and "%" refers to "wt %" unless otherwise indicated.

EXAMPLES AND COMPARATIVE EXPERIMENTS

A. Compositions Comprising Acicular Oxide Particles (A-1)

Preparation Example 1

Preparation of Acicular Antimony-containing Tin Oxide (Compound (A-1))

300 parts by weight of acicular antimony-containing tin oxide (manufactured by Ishihara Techno Co., Ltd.) was added to 700 parts by weight of methyl ethyl ketone (MEK) and dispersed for 10 hours using glass beads. Glass beads were removed to obtain 950 parts by weight of an acicular antimony-containing tin oxide sol in MEK (hereinafter may be referred to as "acicular ATO sol"). 2 g of the acicular ATO sol was weighed on an aluminum dish and dried for one hour on a hot plate at 120° C. The dried material was weighed to confirm that the solid content was 30%.

Comparative Preparation Example 1

Preparation of Spherical Antimony-containing Tin Oxide Sol 300 parts by weight of spherical antimony-containing tin oxide (SN-102P, manufactured by Ishihara Techno Co., Ltd.) was added to 700 parts by weight of MEK and dispersed for 10 hours using glass beads. Glass beads were removed to obtain 950 parts by weight of a spherical antimony-containing tin oxide sol in MEK (hereinafter may be referred to as "spherical ATO sol"). 2 g of the spherical ATO sol was weighed on an aluminum dish and dried for one hour on a hot plate at 120° C. The dried material was weighed to confirm that the solid content was 30%.

Preparation Example 2

Preparation of Reactive Acicular Antimony-containing Tin Oxide (Compound (RA-1)) Sol with an Organic compound Having a Polymerizable Unsaturated Group Bonded (2–1) Synthesis of an Organic Compound Having a Polymerizable Unsaturated Group A vessel equipped with a stirrer was charged with 7.8 g of mercaptopropyltrimethoxysilane and 0.2 g of dibutyltin dilaurate to make a solution. 20.6 g of isophorone diisocyanate was added dropwise to the solution in dry air in one hour at 50° C. The mixture was stirred for a further three hours at 60° C. 71.4 g of pentaerythritol triacylate (NK Ester A-TMM-3L, manufactured by Shin-Nakamura Chemical Co., Ltd.) was added dropwise to the reaction solution at 30° C. over one hour, then the mixture was stirred at 60° C. for 3 hours to obtain a reaction solution.

The residual isocyanate content in the resulting product (the organic compound having a polymerizable unsaturated group) was analyzed by FT-IR and found to be 0.1 wt % or less. This confirms that the reactions have been completed almost quantitatively. In addition, the organic compound was confirmed to have a thiourethane bond, urethane bond, alkoxysilyl group, and polymerizable unsaturated group.

(2–2) Synthesis of Reactive Acicular Antimony-containing Tin Oxide Sol (RA-1)

A vessel equipped with a stirrer was charged with 95 g of a dispersion liquid of acicular antimony-containing tin oxide (FSS-10M, solvent: MEK, the total solid content: 30 wt %, manufactured by Ishihara Techno Co., Ltd.), 4.0 g of the organic compound having a polymerizable unsaturated group prepared in (2–1) above, 0.1 g of distilled water, and 0.01 g of p-hydroxyphenyl monomethyl ether. The mixture was heated at 65° C. with stirring. After 5 hours, 0.7 g of ortho-methyl formate was added and the mixture was heated for a further one hour to obtain a reactive acicular antimony-containing tin oxide sol (hereinafter may be referred to as "reactive acicular ATO sol"). 2 g of the reactive acicular ATO sol thus obtained was weighed on an aluminum dish and dried for one hour on a hot plate at 120° C. The dried material was weighed to confirm that the solid content was 33%. 2 g of the reactive acicular ATO sol thus obtained was weighed in a magnetic crucible, preliminary dried for 30 minutes on a hot plate at 80° C., and burnt for one hour in a muffle furnace at 750° C. The content of inorganic components was determined from the resulting inorganic residue to confirm that the content was 79 wt %. The inorganic component content according this measuring method corresponds to the ATO content in the total solid components.

Preparation Example 3

Synthesis of a Mixture of a Reaction Product of Hydroxyl Group-containing Polyfunctional (Meth)acrylate and Diisocyanate (AC) and a Polyfunctional (Meth)acrylate (Compound 94.0 g of dipentaerythritol pentacrylate (hydroxyl group-containing polyfunctional (meth)acrylate, KAYARAD DPHA, manufactured by Nippon Kayaku Co., Ltd., dipentaerythritol pentacrylate:dipentaerythritol hexacrylate (hereinafter referred to as "B-1")=4:6) was added dropwise to a mixed solution of 6.0 g of hexamethylene diisocyanate and 0.02 g of dibutyltin dilaurate in dry air at 20° C. over one hour. The mixture was stirred for one hour at room temperature, then three hours while heating at 60° C., to obtain a mixture of a reaction product of dipentaerythritol pentacrylate and hexamethylene diisocyanate (hereinafter referred to as "AC-1") and B-1 (the mixture is hereinafter referred to as "M-1"). The residual isocyanate content in the reaction solution was analyzed and found to be 0.1% or less, confirming that the reaction was completed almost quantitatively. The content of AC-1 in M-1 was determined from the raw material feed rate to confirm that the content of AC-1 was 44%.

Preparation Example 4

Synthesis of a Mixture of a Reaction Product of Hydroxyl Group-containing Polyfunctional (Meth)acrylate and Diisocyanate (an Acrylate-cyanate Reaction Product (AC)) and a Polyfunctional (Meth)acrylate (Compound (B))

0.1 g of dibutyltin dilaurate was added dropwise to a mixed solution of 40.9 g of pentaerythritol tricrylate (NK Ester A-TMM-3L, manufactured by Shin-Nakamura Chemical Co., Ltd., pentaerythritol triacrylate:pentaerythritol tetracrylate (hereinafter referred to as "B-2")=6:4) and 18.3 g of isophorone diisocyanate in dry air. The mixture was stirred for one hour at room temperature, then for 3 hours at 50° C. After the addition of 40.9 g of pentaerythritol triacylate dropwise over one hour, the mixture was stirred for 3 hours at 60° C. to obtain a mixture of a reaction product of pentaerythritol triacylate and isophorone diisocyanate (hereinafter referred to as "AC-2") and B-2 (this mixture is hereinafter referred to as "M-2"). The residual isocyanate content in the reaction solution was analyzed and found to be 0.1 wt % or less, confirming that the reaction was completed almost quantitatively. The content of AC-2 in M-2 was determined from the raw material feed rate to confirm that the content of AC-2 was 67%.

Examples for the preparation of the curable composition and cured product of the present invention are shown in Examples 1–5 and Comparative Examples 1–5.

Example 1

As shown in Table 1, a UV shielded vessel was charged with 190 g of acicular ATO (A-1) sol prepared in Preparation Example 1 (57 g as acicular ATO particles), 28.9 g of the mixture (M-1) prepared in Preparation Example 3 (12.7 g as AC-1 and 16.2 g as B-1), 10.6 g of the mixture (M-2) prepared in Preparation Example 4 (7.1 g as AC-2 and 3.5 g as B-2), 3.5 g of 1-hydroxycyclohexyl phenyl ketone (hereinafter referred to as "C-1"), and 37 g of MEK. The mixture was stirred for two hours at 50° C. to obtain a homogeneous solution of a curable composition. The total solid content in the curable composition and the inorganic content in the total solid components were determined in the same manner as respectively in Preparation Examples 1 and 2, to find that the total solid content and the inorganic content were respectively 37% and 57%.

The curable composition was diluted with methyl isobutyl ketone to make the total solid component concentration 5 wt %. The composition solution was applied to an untreated surface or treated surface for easy adhesion of a polyethylene terephthalate (PET) film A4100 (manufactured by Toyobo Co., Ltd., film thickness: 188 μm) using a wire bar coater. The coating was dried for one minute in an oven at 80° C. A cured coating layer with a thickness of 0.1 μm was formed by curing the coating by irradiating UV ray at a dose of 0.3 J/cm$^2$ from a high pressure mercury lamp in a nitrogen atmosphere. The curable composition of Example 3 and Comparative Example 2 were applied without diluting with methyl isobutyl ketone.

Examples 2–6

Curable resin compositions were prepared in the same manner as in Example 1 except for using the acicular ATO sol or reactive acicular ATO sol, and compounds (AC), (B) and (C) according to the formulation shown in Table 1, provided that in preparing Example 4 the mixture (M-2) and trimethylolpropane triacrylate (hereinafter referred to as "B-3") were added to the compound (B) and the acrylate-cyanate reaction product. In Example 6, after mixing the compounds in the same manner as in Example 1, the composition was condensed by rotary evaporator to make the total solid component concentration 52 wt %.

The total solid concentration in the curable composition and the inorganic content in the total solid components were determined in the same manner as in Example 1.

The curable compositions were cured in the same manner as in Example 1 to obtain cured products.

Comparative Examples 1–6

Curable resin compositions for Comparative Examples 1–2 and Comparative Examples 4–6 were prepared in the same manner as in Example 1 except for using the spherical ATO sol or acicular ATO sol, and the compounds (AC), (B) and (C) according to the formulation shown in Table 1. The curable composition of Comparative Example 3 was obtained by condensing the composition in the same manner as in Example 6.

The total solid concentration in the curable composition and the inorganic content in the total solid components were determined in the same manner as in Example 1.

The curable compositions were cured in the same manner as in Example 1 to obtain cured products.

The curable compositions of Comparative Examples 1–4 are compositions using the compound (A-1) in which form spherical ATO is used instead of acicular ATO. The curable composition of Comparative Example 5 contains the compound (A-1) and the acrylate-cyanate reaction product (AC) in amounts outside the range defined in the present invention, and the curable composition of Comparative Example 6 contains the compound (C) in an amount outside the range defined in the present invention.

Test Example 1

The surface resistance of the cured products obtained in Examples 1–6 and Comparative Examples 1–6 was determined by the following measuring method. In addition, the adhesion, post-QUV adhesion, and scratch resistance of the cured products were evaluated according to the following standards.

(1) Surface Resistance

The surface resistance (Ω/+) of the cured product produced by applying the curable composition to the untreated PET surface was measured using a high resistivity meter ("HP4339", manufactured by Hewlett Packard) with an electrode area of 26 mmΦ and an applied voltage of 100 V. The results are shown in Table 1. In addition, the following surface resistance values were shown in FIG. 1 to show the relationship between the content of acicular ATO or spherical ATO in the curable compositions and the surface resistance of the cured products.

A cured product containing 40 wt % of acicular ATO (Example 6)
A cured product containing 49.9 wt % of acicular ATO (Example 3)
A cured product containing 57.0 wt % of acicular ATO (Example 1)
A cured product containing 74.9 wt % of acicular ATO (Example 2)
A cured product containing 40 wt % of spherical ATO (Comparative Example 3)
A cured product containing 49.9 wt % of spherical ATO (Comparative Example 2)
A cured product containing 57.0 wt % of spherical ATO (Comparative Example 1)
A cured product containing 74.9 wt % of spherical ATO (Comparative Example 4)

(2) Adhesion and Post-QUV Adhesion.

The number of remaining 1 mm×1 mm squares among 100 squares in the cellophane tape cross-cut peeling test according to JIS K5400 was counted and the percentage was determined to evaluate the adhesion of cured products (coatings) produced on the surface of PET film processed for easy attachment.

Furthermore, the cured film was irradiated with UV light for 150 hours using a QUV accelerated weathering tester (manufactured by Q-Panel Co., Ltd.) and the adhesion was evaluated in the same manner as above. The results are shown in Table 1.

(3) Scratch Resistance

0000 steel wool was reciprocated 10 times with a load of 40 g/cm$^2$ on the surface of cured coating produced on the PET film processed for easy attachment to evaluate the scratch resistance by naked eye observation. The observation results were rated according to the following standard. The results are shown in Table 1.

Score 5: No scratch damage was found.
Score 4: 1–5 scratch damages were found.
Score 3: 6–50 scratch damages were found.
Score 2: 51–100 scratch damages were found.
Score 1: Peel of coating was found.

A coating with scratch resistance of Score 3 or above can be used without problem in actual application. Score 4 represents excellent scratch resistance of the coating, and Score 5 represents remarkable improvement of resistance in actual application.

TABLE 1

|  | Example | | | | | | Comparative Example | | | | | |
|---|---|---|---|---|---|---|---|---|---|---|---|---|
|  | 1 | 2 | 3 | 4 | 5 | 6 | 1 | 2 | 3 | 4 | 5 | 6 |
| Compound (A-1) or (A-2) | | | | | | | | | | | | |
| Acicular ATO (A-1) sol | 57.0 | 74.9 | 49.9 | — | — | 40.0 | — | — | — | — | 30.0 | 57.0 |
| Reactive acicular ATO (RA-1) sol | — | — | — | 75.0 | 67.0 | — | — | — | — | — | — | — |
| Spherical ATO sol | — | — | — | — | — | — | 57.0 | 49.9 | 40.0 | 74.9 | — | — |
| Inorganic content in the total solid components | 57.0 | 74.9 | 49.9 | 59.0 | 53.0 | 40.0 | 57.0 | 49.9 | 40.0 | 74.9 | 30.0 | 57.0 |
| Acrylate-cyanate reation product (AC) | | | | | | | | | | | | |
| AC-1 | 12.7 | 6.9 | 15.0 | — | 9.0 | 18.2 | 12.7 | 15.0 | 18.2 | 6.9 | — | 8.1 |
| AC-2 | 7.1 | 3.9 | 8.4 | 12.0 | 5.0 | 10.2 | 7.1 | 8.4 | 10.2 | 3.9 | 44.6 | 4.5 |
| Polyfunctional (meth)acrylate (B) | | | | | | | | | | | | |
| B-1 | 16.2 | 8.8 | 19.1 | — | 11.5 | 23.1 | 16.2 | 19.1 | 23.1 | 8.8 | — | 10.2 |
| B-2 | 3.5 | 1.9 | 4.1 | 5.9 | 2.5 | 5.0 | 3.5 | 4.1 | 5.0 | 1.9 | 21.9 | 2.2 |
| B-3 | — | — | — | 2.1 | — | — | — | — | — | — | — | — |
| Photoinitiator (C) | | | | | | | | | | | | |
| C-1 | 3.5 | 3.5 | 3.5 | 3.5 | 3.5 | 3.5 | 3.5 | 3.5 | 3.5 | 3.5 | 3.5 | 12.6 |
| C-2 | — | — | — | 1.5 | 1.5 | — | — | — | — | — | — | 5.4 |

TABLE 1-continued

|  | Example | | | | | | Comparative Example | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Organic solvent | | | | | | | | | | | | |
| MEK | 170.0 | 174.8 | 1900.0 | 170.0 | 170.0 | 170.0 | 92.3 | 1900.0 | 92.3 | 174.8 | 170.0 | 170.0 |
| MIBK | — | — | — | 42.5 | — | — | — | — | — | — | — | — |
| Toluene | — | — | — | — | 42.5 | — | — | — | — | — | — | — |
| Total | 270.0 | 274.8 | 2000.0 | 312.5 | 12.5 | 192.3 | 270.0 | 2000.0 | 192.3 | 274.8 | 270.0 | 270.0 |
| Total solid concentration | 37 | 36 | 5 | 32 | 32 | 52 | 37 | 5 | 52 | 36 | 37 | 37 |
| Cured product properties | | | | | | | | | | | | |
| Surface resistance ($\Omega$//+) | $8 \times 10^8$ | $3 \times 10^8$ | $4 \times 10^{11}$ | $8 \times 10^7$ | $1 \times 10^6$ | $2 \times 10^{14}$ | $3 \times 10^{14}$ | $8 \times 10^{14}$ | $9 \times 10^{14}$ | $2 \times 10^6$ | $1 \times 10^{15}$ | $2 \times 10^8$ |
| Adhesion (%) | 100 | 100 | 100 | 100 | 100 | 100 | 100 | 100 | 100 | 100 | 100 | 100 |
| Adhesion after QUV (%) | 100 | 100 | 100 | 100 | 100 | 100 | 100 | 100 | 100 | 100 | 100 | 100 |
| Scratch resistance | 4 | 4 | 4 | 5 | 5 | 4 | 4 | 3 | 3 | 2 | 2 | 2 |

*The amount for Acicular ATO sol, Reactive acicular ATO (RA-1) sol, and Spherical ATO sol represents the amount of dry fine particles (excluding organic solvent) in the charged dispersed sol.
Abbreviations in Table 1 are as follows:
AC-1: Reaction product of hydroxyl group-containing polyfunctional (meth)acrylate and hexamethylene diisocyanate synthesized in Preparation Example 3
AC-2: Reaction product of hydroxyl group-containing polyfunctional (meth)acrylate and isophorone diisocyanate synthesized in Preparation Example 4
B-1: Dipentaerythritol hexacrylate
B-2: Pentaerythritol tetracrylate
B-3: Trimethylolpropane triacrylate
C-1: 1-Hydroxycyclohexyl phenyl ketone
C-2: 2-Methyl-1-[4-(methylthio)phenyl]-2-morpholino-1-propanone
MEK: Methyl ethyl ketone
MIBK: Methyl isobutyl ketone FIG. 1 shows the relationship between the content of acicular ATO or spherical ATO and with the surface resistance of cured products.

B. Compositions Comprising Acicular Oxide Particles (A-1) and Particles Other than Acicular Particles (A-2)

Preparation Example 4

Preparation of Spherical Zirconia Fine Particle Sol (A-2)

300 parts of spherical zirconia fine particles (manufactured by Sumitomo Osaka Cement Co., Ltd.) was added to 700 parts of methyl ethyl ketone (MEK) and dispersed for 168 hours using glass beads. Glass beads were removed to obtain 950 parts of spherical zirconia fine particle sol (A-2).

2 g of the spherical zirconia fine particle sol was weighed on an aluminum dish and dried for one hour over a hot plate at 120° C. The weight of the dried material was determined to confirm that the solid content was 30%.

The solid material was observed by electron microscope to confirm that particles have a short axis average particle diameter of 15 nm, a large axis average particle diameter of 20 nm, and an aspect ratio of 1.3.

Preparation Example 5

Synthesis of an Organic Compound Having a Polymerizable Unsaturated Group

A vessel equipped with a stirrer was charged with 7.8 parts of mercaptopropyltrimethoxysilane and 0.2 part of dibutyltin dilaurate to make a solution. 20.6 parts of isophorone diisocyanate was added dropwise to the solution in dry air in one hour at 50° C. The mixture was stirred for a further three hours at 60° C.

After the addition of 71.4 parts of pentaerythritol triacrylate dropwise at 30° C. in one hour, the mixture was stirred at 60° C. for three hours to obtain a reaction solution.

The residual isocyanate content in the reaction solution (the organic compound having a polymerizable unsaturated group) was analyzed by FT-IR and found to be 0.1 wt % or less. This confirms that the reactions have been completed almost quantitatively. In addition, the organic compound was confirmed to have a thiourethane bond, urethane bond, alkoxysilyl group, and polymerizable unsaturated group.

Preparation Example 6

Synthesis of reactive acicular antimony-containing tin oxide (ATO) fine particle sol (RA-a) with an organic compound having a polymerizable unsaturated group bonded A vessel equipped with a stirrer was charged with 95 parts of an acicular ATO dispersion liquid (A-a) ("FSS-10M" manufactured by Ishihara Techno Co., Ltd., solvent: MEK, the solid content: 30 wt %, short axis average particle diameter of the acicular ATO fine particles: 15 nm, large axis average particle diameter: 150 nm, aspect ratio: 10), 0.8 part of the organic compound having a polymerizable unsaturated group prepared in Preparation Example 5, 0.1 part of distilled water, and 0.01 part of p-hydroxyphenyl monomethyl ether. The mixture was heated at 65° C. with stirring. After 5 hours, 0.3 part of methyl orthoformate was added. The mixture was heated for a further one hour to obtain a reactive acicular ATO fine particle sol (RA-a).

2 g of the fine spherical zirconia powder sol was weighed on an aluminum dish and dried for one hour on a hot plate at 120° C. The weight of the dried material was determined to confirm that the solid content was 30%. 2 g of the reactive acicular ATO fine particle sol was weighed in a magnetic crucible, preliminary dried for 30 minutes on a hot plate at 80° C., and incinerated for one hour in a muffle furnace at 750° C. The content of inorganic components in the solid components was determined from the resulting inorganic residue to confirm that the content of inorganic components was 88 wt %.

Preparation Example 7

Synthesis of Reactive Zirconia Fine Particle Sol (RA-2)

A mixture of 5.2 parts of the organic compound having a polymerizable unsaturated group synthesized in Preparation Example 5, 237 parts of spherical zirconia fine particle sol (A-2) (zirconia content: 30%) obtained in Preparation Example 4, 0.1 part of ion-exchanged water, and 0.03 part of p-hydroxyphenyl monomethyl,ether was stirred for 3 hours at 60° C. After the addition of 1.0 part of methyl orthoformate, the mixture was stirred for a further one hour at the same temperature to obtain a reactive zirconia fine particle sol (RA-2).

The solid content of the reactive zirconia fine particle sol and the inorganic content in the solid components were measured in the same manner as in Preparation Example 6 to confirm that the solid content and the inorganic content were respectively 31% and 93%.

Preparation Example 8

Synthesis of Reactive ATO Fine Particle sol (A-3)

A vessel equipped with a stirrer was charged with 95.0 parts of a dispersion liquid of antimony-containing tin oxide (ATO) ("SNS-10M" manufactured by Ishihara Techno Co., Ltd., solvent: MEK, ATO content: 27.4%, solid content: 30 wt %, short axis average particle diameter of the ATO fine particles: 22 nm, large axis average particle diameter: 25 nm, aspect ratio: 1.1), 4.0 parts of the organic compound having a polymerizable unsaturated group synthesized in Preparation Example 5, 0.1 part of distilled water, and 0.03 part of p-hydroxyphenyl monomethyl ether. The mixture was heated at 65° C. with stirring. After 5 hours, 0.7 part of methyl orthoformate was added. The mixture was stirred for a further one hour at the same temperature to obtain a reactive ATO fine particle sol (RA-3).

The solid content of the reactive ATO fine particle sol (RA-3) and the inorganic content in the solid components were measured in the same manner as in Preparation Example 3 to confirm that the solid content and the inorganic content were respectively 33% and 80%.

Preparation Example 9

Preparation of Curable Composition for Forming Low Refractive Index Film (1) Preparation of Fluorine-containing Polymer Having a Hydroxyl Group A 1.5 l stainless steel autoclave equipped with an electromagnetic stirrer, in which the internal atmosphere was sufficiently replaced with nitrogen gas, was charged with 500 g of ethyl acetate, 34.0 g of ethyl vinyl ether (EVE), 41.6 g of hydroxyethyl vinyl ether (HEVE), 75.4 g of perfluoropropyl vinyl ether (FPVE), 1.3 g of lauroyl peroxide, 7.5 g of silicone-containing high polymer azo initiator ("VPS1001" manufactured by Wako Pure Chemical Co., Ltd.), and 1 g of a reactivity emulsifying agent ("NE-30" Manufactured by Asahi Denka Kogyo Co., Ltd.). After cooling the solution in the autoclave to −50° C. with dry ice-methanol, the oxygen in the system was again replaced with nitrogen gas.

119.0 g of hexafluoropropylene (HFP) was added and the monomer solution was heated. The pressure in the autoclave was $5.5 \times 10^5$ Pa, when the temperature in the autoclave reached 70° C. After stirring the mixture for 20 hours at 70° C., the pressure in the autoclave was decreased to as low as $2.3 \times 10^5$ Pa and the reaction was terminated by cooling the autoclave with water. After cooling the reaction solution to room temperature, the unreacted monomers were removed. Then, the autoclave was opened to obtain a polymer solution with a solid content of 30%. The resulting polymer solution was poured into methanol to precipitate the polymer. The precipitate was washed with methanol and dried under vacuum at 50° C. to obtain 170 g of fluorine-containing polymer having a hydroxyl group.

The intrinsic viscosity of the resulting fluorine-containing polymer having a hydroxyl group measured at 25° C. using an N,N-dimethylacetamide solvent was 0.28 dl/g.

The glass transition temperature of the fluorine-containing polymer determined using a differential scanning calorimeter (DSC) at a heating rate of 5° C/min. in a nitrogen gas stream was 31° C.

The fluorine content of the fluorine-containing polymer determined by the Alizarin Complexon method was 51.7%.

The hydroxyl value of the fluorine-containing polymer determined by the acetylation method using acetic anhydride was 102 mg KOH/g.

(2) Preparation of Curable Composition

A vessel equipped with a stirrer was charged with 100 g of the fluorine-containing copolymer having a hydroxyl group obtained in (1) above, 11.1 g of an alkoxylated methyl melamine compound ("Cymel 303" manufactured by MITSUI CYTEC LTD.), and 3,736 g of methyl isobutyl ketone (MIBK). The mixture was stirred for 5 hours at 110° C. to react the fluorine-containing copolymer having a hydroxyl group and Cymel 303.

After the addition of 11.1 g of CATALYST 4040 (manufactured by MITSUI CYTEC LTD., solid content: 40 wt %), the mixture was stirred for further 10 minutes to obtain a curable composition for forming low refractive index film having a viscosity of 1 m Pa·s (measured at 25° C).

The refractive index of the low refractive index film obtained from the composition was measured. The curable composition for forming low refractive index film was applied onto a silicon wafer (thickness: 1 μm) using a wire bar coater (#3) and dried in air for 5 minutes at room temperature to form a film.

The film was cured by heating for one minute at 140° C. in a hot-air dryer to obtain a low refractive index film with a thickness of 0.3 μm. The Na-D light refractive index of the resulting low refractive index film was measured using a spectroscopic ellipsometer at 25° C. The refractive index was 1.40.

Example 7

(1) Preparation of Photo-curable Composition

In a UV shielded vessel, 107.7 parts of the reactive acicular ATO fine particle sol (RA-a) prepared in the Preparation Example 6 (reactive acicular ATO: 32.3 parts), 149.4 parts of the reactive zirconia fine particle sol (RA-2) prepared in the Preparation Example 7 (reactive zirconia: 46.3 parts), 12.6 parts of dipentaerythritol pentacrylate ("KAYARAD DPHA" manufactured by Nippon Kayaku Co., Ltd.) (C-1), 4.0 parts of melamine acrylate ("Nikalac MX-302" manufactured by SANWA CHEMICAL Co., Ltd.) (B-3), 0.5 part of 2-methyl-1-[4-(methylthio)phenyl]-2-morpholinopropanon-1 (C-2), and 3.8 parts of a photo acid generator ("Silacure UVI-6950" manufactured by Union Carbide Corp.) were mixed by stirring for two hours at 50° C. to obtain a composition in the form of a homogeneous solution. The solid content of the composition determined in the same manner as in the Preparation Example 4 was 36%.

(2) Preparation of Antireflection Film Laminated Board

A UV curable hard coating composition ("Z7503" manufactured by JSR Corp., solid content: 50%) was applied onto a polyester film ("A4300" manufactured by Toyobo Co., Ltd., film thickness: 188 µm) using a wire bar coater (#20) and dried for one minute in an oven at 80° C. to form a film. The film was cured by irradiating UV light from a metal halide lamp at a dose of 0.3 $J/cm^2$ in the air to obtain a hard coating layer with a thickness of 10 µm.

The composition prepared in (1) above was applied onto the hard coating layer using a coater equipped with a wire bar appropriate to the film thickness and dried for one minute in an oven at 80° C. to form a coating. This coating was cured by irradiating UV light from a metal halide lamp at a dose of 0.3 $J/cm^2$ in the air to obtain a cured coating layer (high refractive index layer) with a thickness shown in Table 1.

The curable composition for forming low refractive index film prepared in the Preparation Example 9 was applied onto the cured high refractive index layer using a wire bar coater (#3) and dried in air for 5 minutes at room temperature to form a coating. This finally obtained coating was cured by heating for one minute in an oven at 140° C. to form a low refractive index film with a thickness of 0.1 µm, thereby obtaining an antireflection film laminated board.

Example 8

(1) Preparation of Photo-curable Composition 107.7 parts of the reactive acicular ATO fine particle sol (RA-a) prepared in the Preparation Example 6 (reactive acicular ATO: 32.3 parts), 149.4 parts of the reactive zirconia fine particle sol (RA-2) prepared in the Preparation Example 7 (reactive zirconia: 46.3 parts), 12.6 parts of dipentaerythritol pentacrylate ("KAYARAD DPHA" manufactured by Nippon Kayaku Co., Ltd.) (C-1), 4.0 parts of melamine acrylate ("Nikalac MX-302" manufactured by SANWA CHEMICAL Co., Ltd.) (B-3) were mixed in a UV shielded vessel. The mixture was condensed using a rotary evaporator to a solid content of 59.5%. 0.5 part of 1-hydroxycyclohexyl phenyl ketone (C-1), 0.5 part of 2-methyl-1-[4-(methylthio)phenyl]-2-morpholinopropanon-1 (C-2), 3.8 parts of a photo acid generator ("Silacure UVI-6950" manufactured by Union Carbide Corp.), and 43.2 parts of methyl isobutyl ketone were added and the mixture was stirred at 50° C. for two hours to obtain a composition in the form of a homogeneous solution. The solid content of the composition determined in the same manner as in the Preparation Example 4 was 48%.

(2) Preparation of Antireflection Film Laminated Board

An antireflection film laminated board was prepared from the resulting composition in the same manner as in Example 7.

Examples 9–15 and Comparative Example A

Photo-curable compositions were prepared from the components shown in Table 1. Antireflection film laminated boards were prepared from these compositions in the same manner as in Example 7.

The photo-curable compositions of Comparative Examples A does not contain the compound (A).

Test Example 1

Evaluation of Antireflection Film Laminated Boards

Scratch resistance of the antireflection film laminated boards prepared in Examples 7–15 and Comparative Examples A was evaluated as follows. Reflectance, Haze value, luminous transmission, and surface resistance of these antireflection film laminated boards were measured by the following methods.

(1) Scratch Resistance

0000 steel wool was reciprocated 30 times with a load of 200 $g/cm^2$ on the surface of antireflection film laminated boards to evaluate the scratch resistance by naked eye observation. The observation results were rated according to the following standard. The results are shown in Table 1.

Score 5: No scratch damage was found.
Score 4: 1–5 scratch damages were found.
Score 3: 6–50 scratch damages were found.
Score 2: 51–100 scratch damages were found.
Score 1: Peel of coating was found.

A coating with scratch resistance of Score 3 or above can be used without problem in actual application. Score 4 represents excellent scratch resistance of the coating, and Score 5 represents remarkable improvement of scratch resistance in actual application.

(2) Reflectance

The reflectance (the minimum reflectance in the measuring wavelength range) of the antireflection layer laminated boards was measured using a spectrophotometric reflectance measurement apparatus (a spectrophotometer "U-3410" manufactured by Hitachi Ltd. with a large sample room equipped with an integrated sphere "150-09090") according to JIS K7105 (method A) in a wavelength range of 340–700 nm.

Specifically, the minimum reflectance of the antireflection laminated board (antireflection filmy at each wavelength was measured as a standard (100%) for the reflectance of a vapor deposition aluminum film. The results are shown in Table 1.

(3) Haze and Luminous Transmission

The Haze value and luminous transmission of the antireflection film laminated boards were measured according to JIS K7105 using a color Hayes meter (manufacture by Suga Test Instruments Co., Ltd.). The results are shown in Table 2.

(4) Surface Resistance

The surface resistance ($\Omega/\square$) of the cured film on a PET surface was measured using a high resistivity meter ("HCP-HT450" manufactured by Mitsubishi Chemical Corp., electrode: MCP-JB03) at an applied voltage of 100 V (in the case of less than $10^{12}$ $\Omega/\square$) or 1,000 V (in the case of $10^{12}$ $\Omega/\square$ or more). The results are shown in Table 2.

The meanings for the symbols in Table 2 are as follows.

A-1: Acicular ATO fine particle sol
RA-a: Reactive acicular ATO fine particle sol prepared in Preparation Example 6
RA-2: Reactive zirconia fine particle sol prepared in Preparation Example 7
RA-3: Reactive ATO fine particle sol prepared in Preparation Example 8

Example 11

B-1: dipentaerythritol hexacrylate
B-2: pentaerythritol triacrylate
B-3: Melamine acrylate
C-1: 1-hydroxycyclohexyl phenyl ketone
C-2: 2-methyl-1-[4-(methylthio)phenyl]-2-morpholinopropanone-1
MEK: methyl ethyl ketone
MIBK: methyl isobutyl ketone

The invention claimed is:

1. A curable resin composition comprising:
(A-1) surface-treated acicular oxide particles, the oxide comprising an oxide of at least one element selected from the group consisting of silicon, aluminum, zirconium, titanium, zinc, germanium, indium, tin, antimony, and cerium,
(A-2) oxide particles other than the acicular oxide particles (A-1), comprising an oxide of at least one element selected from the group consisting of silicon, aluminum, zirconium, titanium, zinc, germanium, indium, tin, antimony, and cerium,
(B) a compound having two or more polymerizable unsaturated groups,
(C) a photopolymerization initiator
wherein the ratio by weight of (A-1) and (A-2) which is defined as the weight amount of particles (A-1) divided by the total weight of particles (A-1) and (A-2), has a value between 0.2 and 0.9.

TABLE 2

| | Examples | | | | | | | | | Comp. Example |
|---|---|---|---|---|---|---|---|---|---|---|
| | 7 | 8 | 9 | 10 | 11 | 12 | 13 | 14 | 15 | A |
| Chemical (A-1) | | | | | | | | | | |
| Acicular ATO fine powder sol (A-1) | — | — | 38.9 | — | — | 40.0 | — | — | — | — |
| Reactive acicular ATO fine powder sol (RA-a) | 32.3 | 32.3 | — | 20.5 | 72.7 | — | 8.0 | 74.4 | 80.7 | — |
| Chemical (A-2) | | | | | | | | | | |
| Reactive zirconia fine powder sol (RA-2) | 46.3 | 46.3 | 37.6 | 44.1 | — | 46.3 | 68.8 | 4.3 | — | 76.3 |
| Reactive acicular ATO fine powder sol (RA-3) | — | — | — | — | 8.8 | — | — | — | — | — |
| Polyfunctional (meta)acrylate (B) | | | | | | | | | | |
| B-1 | 12.6 | 12.6 | 14.7 | 12.6 | — | 11.7 | 14.4 | 18.3 | 10.5 | 14.9 |
| B-2 | — | — | — | — | 11.6 | — | — | — | — | — |
| B-3 | 4.0 | 4.0 | 4.0 | 4.0 | 2.0 | — | 4.0 | — | 4.0 | 4.0 |
| Photoinitiator (C) | | | | | | | | | | |
| C-1 | 0.5 | 0.5 | 0.5 | 0.5 | 1.5 | 1.0 | 0.5 | 1.5 | 0.5 | 0.5 |
| C-2 | 0.5 | 0.5 | 0.5 | 0.5 | 1.5 | 1.0 | 0.5 | 1.5 | 0.5 | 0.5 |
| Photo acid generator UVI-6950 | 3.8 | 3.8 | 3.8 | 3.8 | 1.9 | — | 3.8 | — | 3.8 | 3.8 |
| Organic solvent | | | | | | | | | | |
| MEK | 178.5 | 64.8 | 174.5 | 146.0 | 187.5 | 196.4 | 171.8 | 183.2 | 188.3 | 169.8 |
| MIBK | — | 43.2 | — | — | — | — | — | — | — | — |
| Total | 278.5 | 208.0 | 274.5 | 278.4 | 287.5 | 296.4 | 271.8 | 283.2 | 288.3 | 269.8 |
| Solid content (%) | 36 | 48 | 36 | 41 | 35 | 34 | 37 | 35 | 35 | 37 |
| Chemical (A-1) in total solid (%) | 28 | 28 | 35 | 18 | 64 | 28 | 7 | 67 | 71 | 0 |
| Chemical (A-2) in total solid (%) | 43 | 43 | 35 | 41 | 7 | 43 | 64 | 4 | 0 | 71 |
| (A-1)/(A-1) + (A-2) | 0.4 | 0.4 | 0.5 | 0.3 | 0.9 | 0.4 | 0.1 | 0.95 | 1.0 | 0.0 |
| Physical properties of laminate | | | | | | | | | | |
| Thickness of hi-refractive layer (micrometer) | 2 | 2 | 2 | 10 | 2 | 0.1 | 2 | 2 | 2 | 2 |
| Reflective index (%) | | | | | | | | | | |
| Luminous transmission (%) | 0.1 | 0.1 | 0.1 | 0.2 | 0.1 | 0.1 | 0.1 | 0.1 | 0.1 | 0.1 |
| Haze (%) | 89 | 90 | 90 | 85 | 90 | 90 | 91 | 90 | 90 | 91 |
| Scratch resistance | 3.0 | 4.2 | 3.0 | 3.0 | 3.0 | 1.5 | 1.3 | 4.5 | 9.9 | 1.2 |
| Surface resistance (ohm/square) | 5 $\times 10^8$ | 5 $\times 10^8$ | 4 $\times 10^8$ | 5 $< 10^6$ | 5 $< 10^6$ | 5 $\times 10^{12}$ | 3 $\times 10^9$ | 5 $< 10^6$ | 4 $< 10^6$ | 1 $\times 10^{13}$ |

*A-1, RA-a, RA-2 and RA-3 represent dry powder weight (excluding organic solvents) in each input weight of the sols 2. The curable composition according to claim 1, wherein the particles (A1) are surface-treated acicular antimony-containing tin oxide particles.

3. The curable composition according to claim 1, wherein the particles (A-2) are surface-treated oxide particles.

4. The curable composition according to claim 1, wherein the particles (A-2) are surface-treated zirconium oxide particles or antimony-containing tin oxide particles.

5. A cured product produced by curing the curable composition according to claim 1.

6. A laminated material comprising a layer of the cured product according to claim 5 on a substrate.

7. The laminated material according to claim 6, wherein the thickness of the cured product layer is 0.05–20 μm.

8. The composition according to claim 1, wherein said composition, when cured, has a surface resistance of no more than $2 \times 10^{14}$ ohm/square.

9. The composition according to claim 8, wherein said composition, when cured, has a surface resistance of less than 10 ohm/square.

10. The composition according to claim 8, wherein said composition, when cured, has a scratch resistance of no less than 4.

11. The laminated material according to clam 6, wherein said laminated material exhibits good antistatic characteristics.

12. The composition according to claim 8, wherein the accicular oxide particles have an aspect ratio of greater than or equal to 5.

13. The composition according to claim 8, wherein the amount of acicular oxide particles (A-1) is from 15 wt. % to 70 wt. %, relative to the total weight of (A-1), (B) and (C).

* * * * *